(12) United States Patent
Bui

(10) Patent No.: US 6,654,077 B1
(45) Date of Patent: Nov. 25, 2003

(54) PRECISION SURFACE MOUNT FOR A DISPLAY DEVICE

(75) Inventor: Doanh D. Bui, Milpitas, CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/483,887

(22) Filed: Jan. 18, 2000

(51) Int. Cl.[7] .............................................. G02F 1/1333
(52) U.S. Cl. .............................. 349/58; 156/556; 445/66
(58) Field of Search ...................... 349/58, 60; 156/556, 156/560, 580, 581; 445/23, 66

(56) References Cited

U.S. PATENT DOCUMENTS

| | | | |
|---|---|---|---|
| 4,796,977 A | 1/1989 | Drake .................... 350/331 R |
| 5,106,441 A | 4/1992 | Brosig et al. ................ 156/104 |
| 5,311,250 A | * 5/1994 | Suzuki et al. ................... 355/76 |
| 5,326,420 A | * 7/1994 | Vinouze et al. .............. 156/379 |
| 5,407,519 A | * 4/1995 | Joffe et al. ................... 156/358 |
| 5,422,751 A | 6/1995 | Lewis et al. ................. 359/83 |
| 5,479,285 A | 12/1995 | Burke .......................... 359/83 |
| 5,539,552 A | 7/1996 | Desai et al. ................... 359/66 |
| 5,587,817 A | 12/1996 | Miyamoto et al. ........... 349/187 |
| 5,592,288 A | 1/1997 | Sampica et al. ............... 356/62 |
| 5,995,179 A | * 11/1999 | Tamura et al. ................. 349/58 |
| 6,067,133 A | * 5/2000 | Niibori et al. ................. 349/60 |
| 6,295,103 B1 | * 9/2001 | Yamatani et al. ............. 349/58 |

* cited by examiner

Primary Examiner—Kenneth Parker
Assistant Examiner—David Chung
(74) Attorney, Agent, or Firm—Henneman & Saunders; Larry E. Henneman, Jr.

(57) ABSTRACT

A micro LCD attachment apparatus (10) for affixing an LCD imager (20) to an LCD frame (18) at a fixed relationship optionally determined by a tape (34). A base (12) has an attachment plate (14) and a plurality of vacuum slots (18) for selectively holding the LCD frame (18). The attachment plate (14) has a shaped aperture (22) for accepting the LCD imager (20) and a plurality of UV light pipes (30) for curing an adhesive (32) which is applied to the LCD imager (20). A hold down arm (24) pivots about a pivot stud (26) to position a hold down pin (28) to hold the LCD imager (20) in place on the LCD frame (18) while the adhesive (32) is cured.

30 Claims, 3 Drawing Sheets

PRECISION SURFACE MOUNT FOR A DISPLAY DEVICE

TECHNICAL FIELD

The present invention relates to the field of electronic imaging devices, and more particularly to a method and apparatus for precision mounting of an imaging device such as a liquid crystal display ("LCD") imaging device. The predominant current usage of the inventive precision surface mount is in the surface mounting of reflective imaging devices in a multi channel projection system, wherein it is particularly important to maintain a precise relationship between a reflective surface of the LCD and a mounting surface.

BACKGROUND ART

Projection type imaging devices commonly use micro LCD imagers. Since the pixel size and spacing on these are so small, they must be precisely placed in relation to surface whereon they are mounted. A typical required gap between the imager and an adjacent surface must be between 0.000 inch and 0.006 inch. Since the cumulative tolerances of the stack-up height of the components on the imager can typically be much larger than the allowable 0.006 inch tolerance, a pre-determined frame thickness cannot be designed to consistently produce imagers that have frames attached and which meet this requirement. Moreover, it is important to maintain the flatness of the imaging device in order to maintain uniformity of the focal plane and to enhance convergence with other such devices in the system.

To the inventors' knowledge, no prior method or apparatus has existed which will consistently result in the precise placement of micro LCD imaging devices necessary for application in high resolution multi channel image projection units. All previous methods have either been insufficiently precise and/or have not produced a consistently acceptable result.

SUMMARY

Accordingly, it is an object of the present invention to provide a method and apparatus for mounting display devices which will result in a video projection engine that will provide sub-pixel accuracy over an entire image range.

It is still another object of the present invention to provide a method and apparatus for mounting display devices which will consistently and reliably result in imagers accurately placed in relation to a mounting surface.

It is yet another object of the present invention to provide a method and apparatus for mounting display devices which is inexpensive to implement, both in time and materials.

It is still another object of the present invention to provide a method and apparatus for mounting display devices which can precisely position the display devices in relation to a mounting surface.

Briefly, an embodiment of the present invention employs an attachment chuck wherein the a display device is held in place by vacuum. A high viscosity and thixotropic ultra violet ("UV") cure adhesive is dispensed onto the imager front side, whereon the frame will be adhered. A spacer, the thickness of the spacing required is placed on the chuck, along with a frame onto which the display device is to be mounted. The display device is then placed in the chuck and the vacuum applied, an optional spring loaded retainer is also pivoted into position to hold the display device against the spacer. A UV light source is then applied from all edges, normal to the exposed surface of the adhesive, until the adhesive is cured. the vacuum is then turned off, the spring loaded retainer moved out of position, and the display device and frame assembly is removed.

An advantage of the present invention is that a display device can be consistently and accurately affixed in relation to a mounting surface.

Another advantage of the present invention is that a display device can be mounted without a great labor expense in an assembly environment.

Yet another advantage of the present invention is that a display device can be mounted without a great expense in materials.

Still another advantage of the present invention is that a multi channel imaging engine can be produced which has sub pixel accuracy and precise focus.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

DETAILED DESCRIPTION

Figure 1:
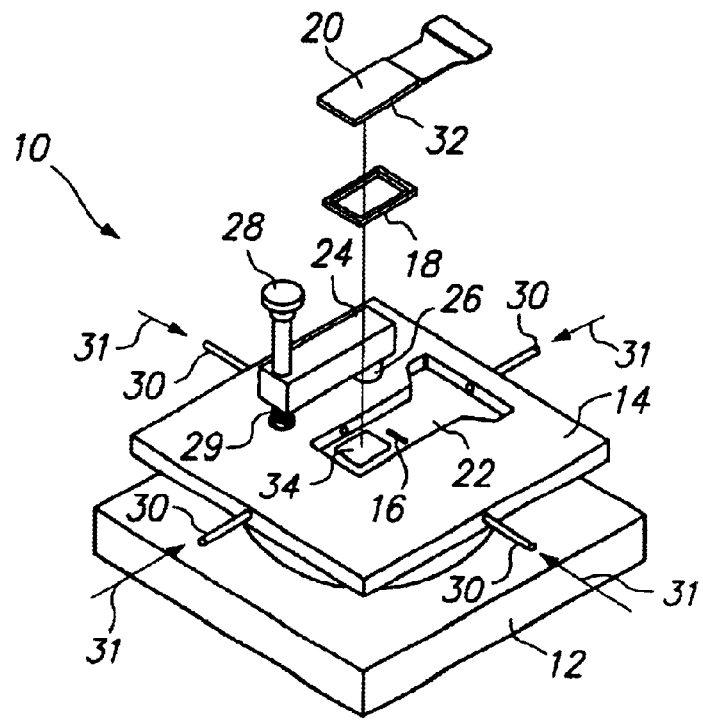
FIG. 1 is an exploded perspective view of a display device attachment apparatus according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Figure 2:
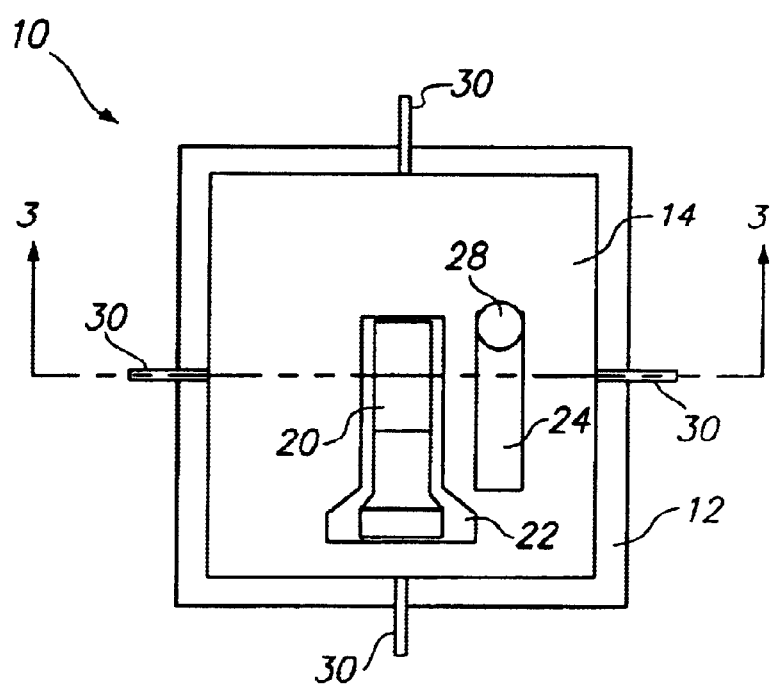
FIG. 2 is a top plan view of the assembled display device attachment apparatus of FIG. 1.

One particular embodiment of the present invention is a micro LCD attachment apparatus. The inventive micro LCD attachment apparatus is illustrated in an exploded perspective view in FIG. 1 and is designated therein by the general reference character 10. The micro LCD attachment apparatus 10 has a base 12 and an attachment plate 14, as illustrated in the view of FIG. 2. The base 12 has a plurality (four in this example, one of which is visible in the view of FIG. 1) of vacuum slots 16 for selectively holding an LCD frame 18, into which a LCD imager 20 is to be mounted, thereon. Vacuum is provided to the vacuum slots 16 in a conventional manner, as one skilled in the art of conventional vacuum chucks will recognize, and the vacuum providing means is, therefore, omitted from the view of FIG. 1 for the sake of clarity.

The attachment plate 14 has a shaped aperture 22 for accepting the LCD imager 20 therethrough. Also on the attachment plate 14 is a hold down arm 24 which pivots about a pivot stud 26 on the attachment plate 14 such that a hold down pin 28 can be selectively moved either over or away from the shaped aperture 22. The hold down pin 28 is spring loaded using a spring 29 to provide downward pressure on the LCD imager 20 when it is positioned thereon. As can be seen in the view of FIG. 1, the spring 29 of this present example is a coil spring positioned such that spring tension acts to pull the hold down pin 28 downward. One skilled in the art will recognize that other types and/or arrangements of springs could readily be adapted to the purpose.

Four UV light pipes 30 pass through the attachment plate 14 so that UV light can be selectively provided (along a plurality of UV light paths 31) to an adhesive 32 which is placed on the LCD imager 20, as will be discussed in more detail hereinafter. It should be noted that, in practice, a UV light source (not shown) will be provided to input UV light into the UV light pipes 30.

In this presently described embodiment 10 of the invention, a piece of Teflon™ tape spacer 34 is placed on the base, under the LCD imager 20, as shown in the view of FIG. 1. In this present example, the inventors have found that, by using a tape of nominal 0.003 inch thickness, the spacing between the bottom (reflective surface) of the LCD imager 20 and the bottom of the LCD frame 18 can reliably be kept to between 0.002 and 0.004 inches.

FIG. 2 is a top plan view of the micro LCD attachment apparatus 10 depicted in FIG. 1. In the view of FIG. 2, the LCD imager 20 is shown in place within the shaped aperture 22 of the attachment plate 14, with the reflective surface of the LCD imager 20 resting on the spacer 34. In the example of FIG. 2, the hold down arm 38 is shown pivoted away from the LCD imager 20.

Figure 3:
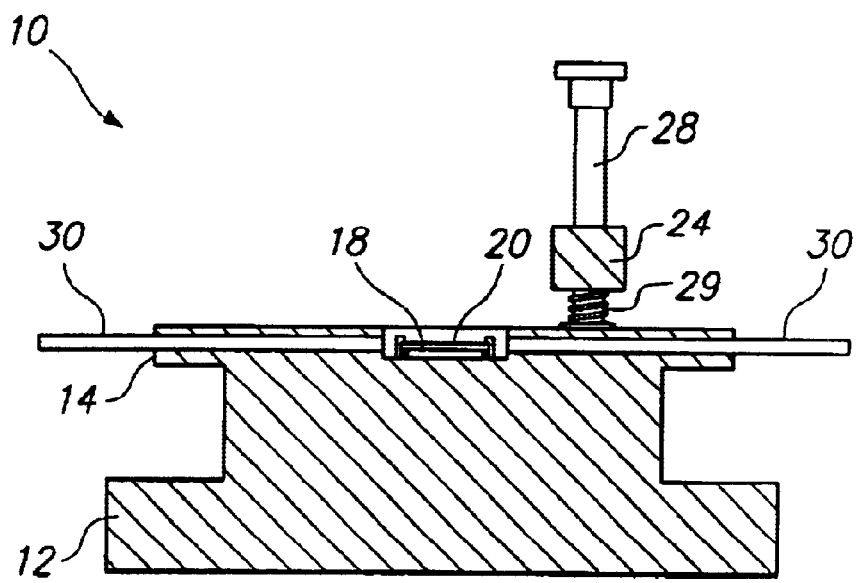
FIG. 3 is a cross sectional elevational view of the display device attachment apparatus of FIGS. 1 and 2, taken along line 3—3 of FIG. 2.
Figure 4:
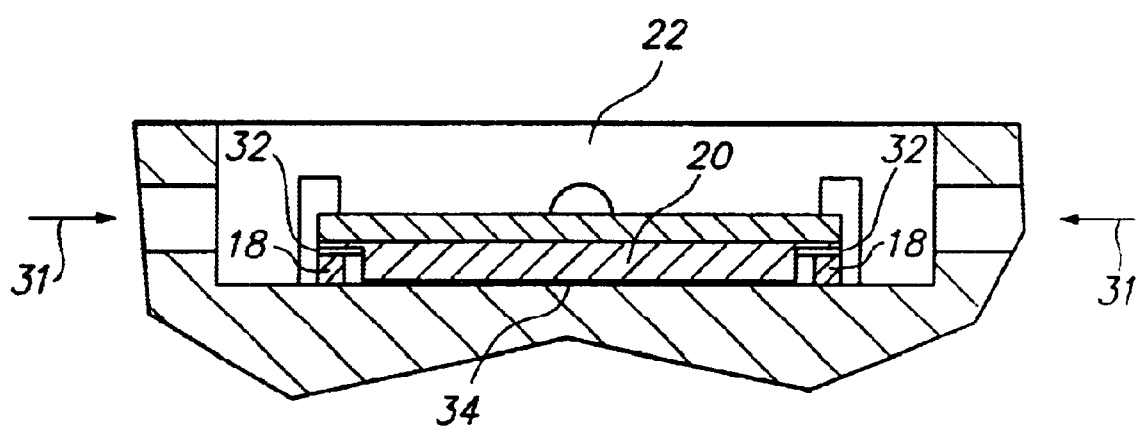
FIG. 4 is a detailed view of a portion of the display device attachment apparatus of FIG. 3.

FIG. 3 is a cross sectional elevational view of the micro LCD attachment apparatus 10, taken along line 3—3 of FIG. 2, showing the LCD imager 20 in place on the LCD frame 18. FIG. 4 is a more detailed view of a portion of the micro LCD attachment apparatus 10, in cross section as in FIG. 3. In the view of FIG. 4, it can be seen that the adhesive 32 adheres the LCD imager 20 to the LCD frame 18. The adhesive 32 forms a rigid bond to prevent movement between the frame 18 and the LCD imager 20.

Figure 5:
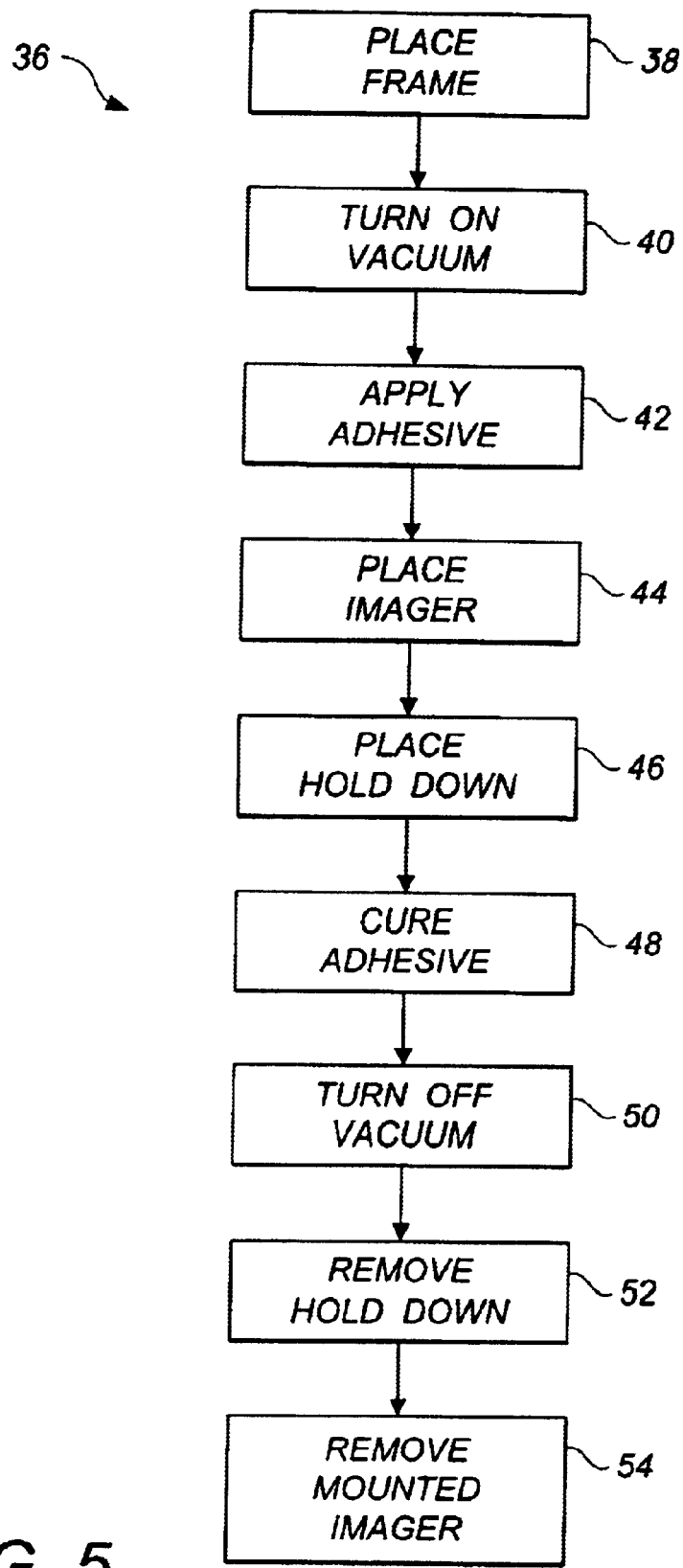
FIG. 5 is a flow diagram depicting an example of the present inventive method.

FIG. 5 is a flow diagram depicting an example of the present inventive method 36. It will be understood that some of the operations described herein could be omitted, other operations could be added, and/or the operations could be accomplished in some order other than that of the example given, all while remaining within the spirit and scope of the invention. In this example, in a place frame operation 38, the LCD frame 18 (FIG. 1) is put in place over the vacuum slots 16. In a vacuum operation 40, vacuum is applied to the vacuum slots 16 to hold the LCD frame 18 in place. In an apply adhesive operation 42, the adhesive 32 is applied around the under perimeter of the LCD imager 20. The dispensed line width of the adhesive 32 should not be wider than the frame 18 width to avoid adhesive extrusion, and the dispensed line height should be thicker than the final expected gap between the frame 18 and the LCD imager 20, to make sure that there is no adhesive void in the gap therebetween.

The LCD imager 20 is then inverted and placed inside the shaped aperture 22 within the LCD frame 18 in a place image operation 44. In a place hold down operation 46, the hold down arm 24 is rotated to position the hold down pin 26 over the LCD imager 20 such that the LCD imager 20 is held in position thereby. The spring tension placed on the LCD imager 20 by the hold down pin 26 is controlled such that the face of the glass or the integrity of the LCD imager 20 will not be physically disturbed. At this point, the reflective surface of the silicon-based component of the LCD imager 20 is resting flush on the Teflon™ tape spacer 34 (in applications where the Teflon™ tape spacer 34 is used), the thickness of which will determine the final gap dimension between the surface of the LCD 20 and the frame 18.

In a cure adhesive operation 48, the UV light source is activated and applied through the UV light pipes 30 to cure the adhesive 32. The UV light pipes 30 are directed at the adhesive 32, normal to the sides of the LCD imager 20 and the LCD frame 18.

After the adhesive 32 is cured, the vacuum is turned off in a turn off vacuum operation 50, and the hold down pin 28 is removed from the LCD imager 20 in a remove hold down operation 52. Then the LCD imager 20, now affixed to the LCD frame 18 is removed from the micro LCD attachment apparatus 10 in a remove is mounted imager operation 54. A result of this process is that it creates a critically required gap or offset between the reference LCD frame 18 and the display surface of the LCD imager 20.

Various modifications may be made to the invention without altering its value or scope. For example, many of the individual components discussed herein in relation to the example of the invention presented may be eliminated or altered. Just one example is that the tape spacer 34 could be eliminated by having a precision machined raised portion of the base 12 substituted therefor.

Yet another example of a likely modification of the invention would be to form a recess in the base 12 where it is required to have the LCD imager 20 protrude beyond the LCD frame 18.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive micro LCD attachment apparatus 10 is intended to be widely used in the construction of projection type imaging devices. Currently, the invention is being applied to the construction of multi channel imaging devices using reflective type LCD imagers 20 such that three of the LCD imagers 20 are employed in each such imaging device. However, it is within the scope of the invention that other types of display devices (not shown) could be employed, and other types of imaging engines constructed, according to the present inventive method.

Since the micro LCD attachment apparatus 10 of the present invention may be readily produced and integrated with existing video creation and display systems and devices, and since the advantages as described herein are provided, it is expected that it will be readily accepted in the industry. For these and other reasons, it is expected that the utility and industrial applicability of the invention will be both significant in scope and long-lasting in duration.

I claim:

1. A display device attachment apparatus for attaching a display device to a frame such that a front surface of the display device is positioned a predetermined distance from a front surface of the frame, the display device attachment apparatus comprising:

a base for holding the frame in position, the base including a first surface disposed to abut the front surface of the frame, and a second surface disposed to abut the front surface of the display device;

a frame holding apparatus adapted to temporarily hold the frame against the first surface; and a hold down device adapted to temporarily hold the display device against the second surface; whereby, after the frame is attached to the display device, the frame and the display device can be removed from the display device attachment apparatus.

2. The display device attachment apparatus of claim 1, and further including:

a hold down device for holding the display device against the spacing device.

3. The display device attachment apparatus of claim 2, wherein:

the spacing device is a piece of tape.

4. The display device attachment apparatus of claim 3, wherein:

the tape is a plastic tape.

5. The display device attachment apparatus of claim 1, wherein:

the hold down device includes an arm and hold down pin.

6. The micro LCD attachment apparatus of claim 5, wherein:

the pin is spring loaded to provide tension against the display device.

7. The display device attachment apparatus of claim 1, wherein:

the first surface and the second surface are offset with respect to one another to provide the predetermined spacing between the front surface of the frame and the front surface of the display device.

8. The display device attachment apparatus of claim 1, wherein:

the frame holding apparatus includes a vacuum passage through the first surface.

9. The display device attachment apparatus of claim 8, wherein:

the vacuum passage is a slot.

10. The display device attachment apparatus of claim 1, and further including:

a UV light pipe for providing UV light to cure an adhesive used to attach the frame to the display device.

11. The display device attachment apparatus of claim 10, wherein:

the UV light pipe provides the UV light normal to a side of the frame.

12. The display device attachment apparatus of claim 1, wherein:

the display device is a micro LCD imager.

13. The display device attachment apparatus of claim 1, wherein:

the display device is a reflective LCD imager.

14. A method for affixing a display device to a frame, comprising:

a. placing a front surface of the frame on a first mounting surface;

b. providing a second mounting surface within the frame;

c. applying an adhesive such that the adhesive will be between the display device and the frame;

d. placing the display device in the frame;

e. holding the front surface of the display device against the second mounting surface;

f. curing the adhesive; and g. removing the display device and the frame from the mounting surfaces.

15. The method of claim 14, wherein:

the operations are performed in the order given in claim 14.

16. The method of claim 14, wherein:

the adhesive is applied to the display device.

17. The method of claim 14, wherein:

the step of holding the front surface of the display device against the second mounting surface includes positioning a spacer between the second mounting surface and the front surface of the display device.

18. The method of claim 14, wherein:

the frame is held in place by a vacuum.

19. The method of claim 14, wherein:

the adhesive is an Ultra Violet cure adhesive.

20. The method of claim 14, and further including:

providing a UV light to cure the adhesive.

21. The method of claim 20, wherein:

the UV light is provided through a light pipe.

22. The method of claim 20, wherein:

the UV light is provided through a plurality of light pipes.

23. The method of claim 20, wherein:

the UV light is provided perpendicular to edges of the frame.

24. A display device attachment apparatus for attaching a display device to a frame, comprising:

a base adapted for positioning the frame;

a positioning surface adapted for positioning the display device; and a hold down mechanism for holding the display device on the frame; whereby a front surface of the frame is held in position with respect to a front surface of the display device while the display device is attached to the frame; and the display device and the frame can be removed from the display device attachment apparatus after the display device is fixed to the frame.

25. The display device attachment apparatus of claim 24, and further including:

a base hold down apparatus for holding the base on the frame.

26. The display device attachment apparatus of claim 25, wherein:

the base hold down apparatus includes at least one vacuum aperture positioned to hold the frame on the base.

27. The display device attachment apparatus of claim 24, wherein:

the hold down mechanism includes a spring for applying tension on the imaging device toward the base.

28. The display device attachment apparatus of claim 24, and further including:

a light pipe apparatus for providing light at least one edge of the imaging device.

29. The display device attachment apparatus of claim 1, further including:

a guide defining a shaped aperture for accepting the display device in proper alignment with the frame.

30. The method of claim 14, wherein:

the first mounting surface is disposed at a different height than the second mounting surface.

* * * * *

UNITED STATES PATENT AND TRADEMARK OFFICE
CERTIFICATE OF CORRECTION

PATENT NO. : 6,654,077 B1
DATED : November 25, 2003
INVENTOR(S) : Bui

It is certified that error appears in the above-identified patent and that said Letters Patent is hereby corrected as shown below:

Column 5,
Line 8, insert -- within said first surface -- between "disposed" and "to".

Column 6,
Line 3, insert -- front of the -- between "the" and "frame".
Line 3, insert -- against a first surface -- after "frame".
Line 5, insert -- , said positioning surface being laterally bounded by said first surface -- after "device".
Line 6, delete "on" and insert -- in position with respect to -- in its place.

Signed and Sealed this

Eighteenth Day of October, 2005

JON W. DUDAS
*Director of the United States Patent and Trademark Office*